United States Patent
Iwakura et al.

(10) Patent No.: US 10,542,348 B2
(45) Date of Patent: Jan. 21, 2020

(54) ELECTROMECHANICAL TRANSDUCER

(71) Applicant: RION Co., Ltd., Tokyo (JP)

(72) Inventors: Takashi Iwakura, Tokyo (JP); Fumitaka Funahashi, Tokyo (JP); Kei Koyama, Tokyo (JP)

(73) Assignee: RION Co., Ltd., Tokyo (JP)

( * ) Notice: Subject to any disclaimer, the term of this patent is extended or adjusted under 35 U.S.C. 154(b) by 0 days.

(21) Appl. No.: 15/959,706

(22) Filed: Apr. 23, 2018

(65) Prior Publication Data
US 2018/0310101 A1    Oct. 25, 2018

(30) Foreign Application Priority Data

Apr. 25, 2017   (JP) .................................. 2017-086591

(51) Int. Cl.
| | |
|---|---|
| *H04R 11/02* | (2006.01) |
| *H04R 1/10* | (2006.01) |
| *H02K 35/06* | (2006.01) |
| *H01F 7/124* | (2006.01) |

(52) U.S. Cl.
CPC ............. *H04R 11/02* (2013.01); *H01F 7/124* (2013.01); *H02K 35/06* (2013.01); *H04R 1/10* (2013.01)

(58) Field of Classification Search
CPC combination set(s) only.
See application file for complete search history.

(56) References Cited

U.S. PATENT DOCUMENTS

| | | |
|---|---|---|
| 9,601,980 B2 | 3/2017 | Iwakura et al. |
| 2014/0270276 A1 | 9/2014 | Iwakura |
| 2015/0207392 A1* | 7/2015 | Iwakura ................. H02K 33/00 310/25 |
| 2017/0244309 A1 | 8/2017 | Iwakura |

FOREIGN PATENT DOCUMENTS

| | | |
|---|---|---|
| JP | 5579335 B1 | 8/2014 |
| JP | 2014179948 A2 | 9/2014 |
| JP | 5653543 B1 | 1/2015 |
| JP | 2015139041 A2 | 7/2015 |
| JP | 2015154402 A2 | 8/2015 |
| JP | 2017147678 A2 | 8/2017 |
| JP | 2017152903 A2 | 8/2017 |

* cited by examiner

*Primary Examiner* — Sunita Joshi
(74) *Attorney, Agent, or Firm* — Rankin, Hill & Clark LLP

(57) ABSTRACT

An electromechanical transducer includes: a structural portion configured such that two pairs of magnets magnetized in opposite directions, a yoke configured to guide magnetic fluxes from the magnets, and a coil configured to receive a supplied electric signal are located integrally; an armature having an inner portion penetrating an internal space of the structural portion and outer portions protruding from the inner portion toward both sides in a first direction, forming, together with the structural portion, a magnetic circuit through regions of the inner portion facing the two pairs of magnets, and configured to displace in a second direction perpendicular to the first direction by magnetic force of the magnetic circuit; and a pair of elastic members each located on both sides of the armature in the second direction, and configured to provide, to the armature, restoring force according to relative displacement of the armature corresponding to the structural portion.

17 Claims, 7 Drawing Sheets

ELECTROMECHANICAL TRANSDUCER

CROSS-REFERENCE TO RELATED APPLICATION

This application claims priority from Japanese Patent Application No. 2017-086591 filed with the Japan Patent Office on Apr. 25, 2017, the entire content of which is hereby incorporated by reference.

BACKGROUND

1. Technical Field

This disclosure relates to an electromechanical transducer.

2. Description of the Related Art

An electromechanical transducer used for a hearing aid and the like includes a driver having an armature, a yoke, a coil, a magnet, and the like. The driver is configured to drive the armature according to an electric signal supplied to the coil. That is, the driver is configured to convert the electric signal into relative oscillation between the armature and another member. Various structures using a flat plate-shaped armature and an elastic member configured to provide restoring force to the armature have been proposed as the electromechanical transducer of this type. For example, in a structure disclosed in Japanese Patent No. 5653543, an armature penetrates an internal space of a structural portion including magnets, yokes, a coil, and the like. Further, in this structure, spring members (elastic members) configured to provide, to the armature, restoring force according to displacement of the armature are provided. These spring members engage with outer portions of the armature and elastic member setting portions of the yokes. Moreover, for example, in a structure disclosed in Japanese Patent No. 5579335, an armature penetrating the above-described internal space and spring members (elastic mechanisms) configured to provide, to the armature, restoring force according to displacement of the armature are provided. Engagement portions of each spring member on both sides thereof engage with both sides of the armature. Further, the spring members and a structural portion are partially fixed by welding.

SUMMARY

An electromechanical transducer includes: a structural portion configured such that two pairs of magnets magnetized in opposite directions, a yoke configured to guide magnetic fluxes from the magnets, and a coil configured to receive a supplied electric signal are located integrally; an armature having an inner portion penetrating an internal space of the structural portion and outer portions protruding from the inner portion toward both sides in a first direction, forming, together with the structural portion, a magnetic circuit through regions of the inner portion facing the two pairs of magnets, and configured to displace in a second direction perpendicular to the first direction by magnetic force of the magnetic circuit; and a pair of elastic members each located on both sides of the armature in the second direction, and configured to provide, to the armature, restoring force according to relative displacement of the armature corresponding to the structural portion. Each elastic member has an opening surrounding the yoke, and part of the yoke projects from the opening in the second direction.

DESCRIPTION OF THE EMBODIMENTS

Figure 1:
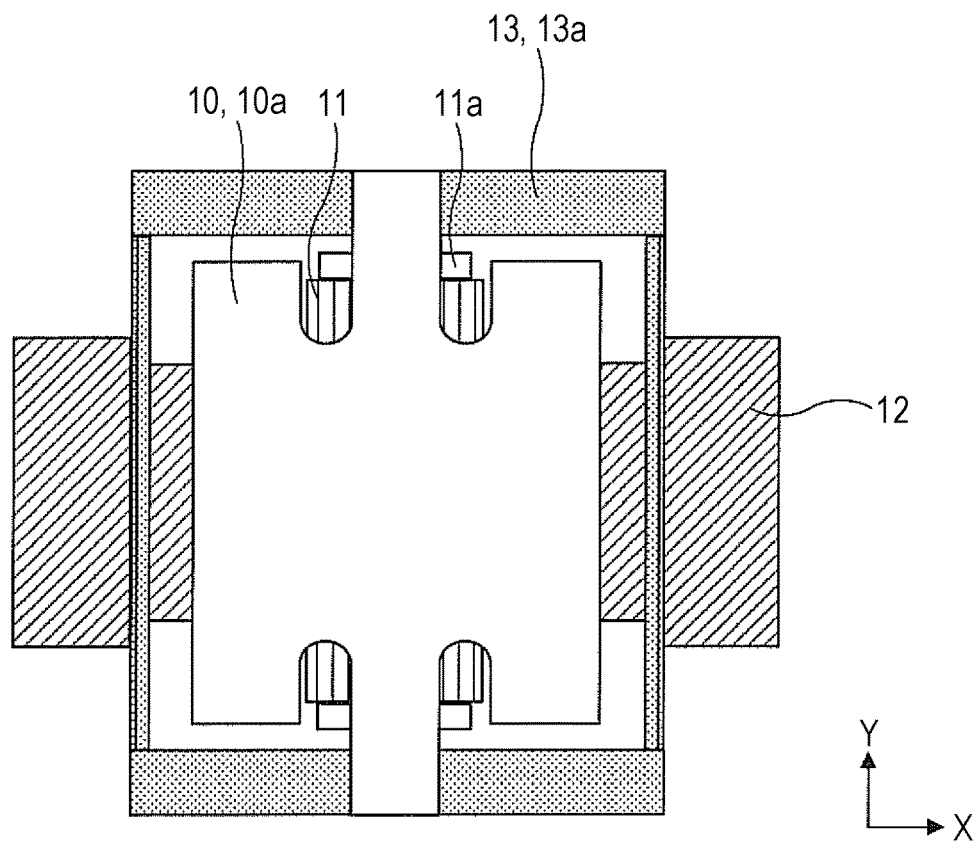
FIG. 1 is an upper view of a driver of an electromechanical transducer of an embodiment from one side of a Z-direction.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 6:
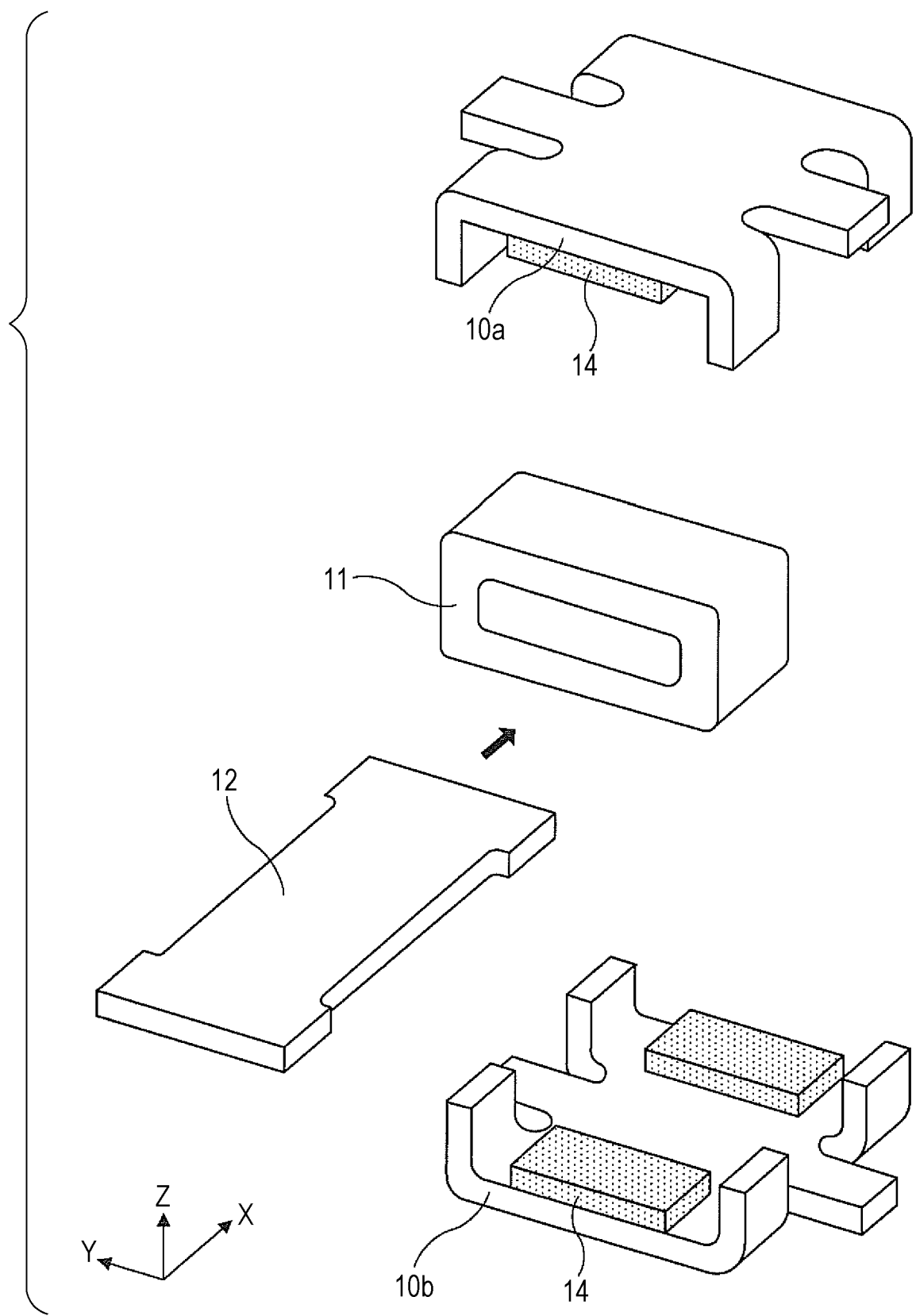
FIG. 6 is an exploded perspective view of a magnetic circuit portion in the electromechanical transducer of the embodiment.

In the structure of Japanese Patent No. 5653543, the spring members 25 having a structure illustrated in FIG. 6 of this patent publication engage, for example, with the outer portions of the armature on both sides in a thickness direction. Thus, the total of four spring members 25 in a complicated shape are located on both sides of the armature, and therefore, each spring member 25 needs to be finely processed with high accuracy. This leads to an increase in the cost of the electromechanical transducer and a problem in component size reduction. Moreover, for example, in the structure of Japanese Patent No. 5579335, upper and lower elastic members 20, 21 illustrated in a pair in FIG. 1 of this patent publication are each fixed to yokes at welding portions while being located to cover the structural portion. Further, each elastic member engages with a corresponding one of both sides of the armature. Normally, in a manufacturing process, no problem is caused even if external force due to contact is applied to the yokes projecting in an upper-to-lower direction when the electromechanical transducer is taken out of a storage pallet and upon a subsequent process. In the structure of this patent publication, the external force due to contact tends to be applied to the elastic members 20, 21 exposed to the outside. For this reason, a relative position relationship between the armature and the structural portion tends to be shifted.

One object of this disclosure is to realize the following electromechanical transducer. This electromechanical transducer has a simple structure, exhibits high workability in assembly, is suitable for component size reduction, and can suppress occurrence of position shifting between an armature and a structural portion upon handling.

An electromechanical transducer according to an aspect of the present disclosure (the present electromechanical transducer)includes: a structural portion configured such that two pairs of magnets (14) magnetized in opposite directions, a yoke (10) configured to guide magnetic fluxes from the magnets, and a coil (11) configured to receive a supplied electric signal are located integrally; an armature (12) having an inner portion penetrating an internal space of the structural portion and outer portions protruding from the inner portion toward both sides in a first direction (X), forming, together with the structural portion, a magnetic circuit through regions of the inner portion facing the two pairs of magnets, and configured to displace in a second direction (Z) perpendicular to the first direction by magnetic force of the magnetic circuit; and a pair of elastic members (13) each located on both sides of the armature in the second direction, and configured to provide, to the armature, restoring force according to relative displacement of the armature corresponding to the structural portion. Each elastic member has an opening (A) surrounding the yoke, and part of the yoke projects from the opening in the second direction.

This electromechanical transducer has the armature penetrating the internal space of the structural portion, and the pair of elastic members configured to provide, to the armature, the restoring force according to displacement of the armature. Each elastic member is located such that the opening of the elastic member surrounds the yoke and the yoke projects from the opening in the second direction. Thus, when the electromechanical transducer is handled, the yoke projecting in the upper-to-lower direction is exposed to the outside. Thus, occurrence of position shifting of the armature relative to the structural portion due to external force applied upon contact with the elastic members can be effectively suppressed. This electromechanical transducer includes the pair of elastic members with a relatively-simple structure. Thus, this electromechanical transducer can be easily assembled, and is also suitable for size reduction.

In this electromechanical transducer, each elastic member may have engagement portions engaging with the armature on both sides in the first direction, and a fixing portion fixed to part of the yoke. The elastic member with such a structure is fixed to the yoke through the fixing portion, and engages with both sides of the armature in the first direction through the engagement portions. Thus, the elastic member can favorably provide the restoring force to the armature with a simple structure being held. Note that the engagement portions of the elastic member may be, for example, recessed portions to be engaged (facing) with the armature. Moreover, the yoke may include protruding portions formed on both sides in a third direction perpendicular to the first direction and the second direction. The fixing portion can be fixed to the protruding portions. Further, each elastic member may be a spring member formed from a plate-shaped member, for example.

Each outer portion of the armature of this electromechanical transducer may have a width greater than that of the inner portion, and a step portion may be formed between each outer portion and the inner portion. Each recessed portion of the pair of elastic members may engage with the step portion. Thus, the recessed portions of the pair of elastic members can easily engage with the step portions of the armature.

This electromechanical transducer may further have two pairs of flat plate-shaped pole pieces set to the armature and each facing the two pairs of magnets. Thus, the armature can be stably positioned at a position at which the pole pieces and the magnets overlap with each other as viewed in the second direction. Here, for enhancing the effect of positioning of the armature, each pole piece may have, as viewed in the second direction, the same shape as that of a corresponding one of the magnets facing through the two regions. Moreover, this electromechanical transducer may further have a pole piece side magnet provided on a surface of each pole piece. This pole piece side magnet may have the same shape as that of a corresponding one of the magnets as viewed in the second direction.

In this electromechanical transducer, the opening surrounding the yoke is formed at each elastic member configured to provide the restoring force to the armature. Further, the yoke is located to project from the opening. Thus, occurrence of position shifting of the armature due to contact of something with the elastic member upon handling of the electromechanical transducer in, e.g., a manufacturing process can be suppressed. Further, this electromechanical transducer includes the pair of elastic members with a relatively-simple structure. Thus, it is not necessary to finely process the elastic members with high accuracy. Consequently, easy assembly and component size reduction can be realized.

Hereinafter, a preferable embodiment of this disclosure will be described with reference to the drawings. Note that the embodiment described later is an example of a form to which the technical idea of this disclosure has been applied. The technical idea of this disclosure is not limited by the contents of this embodiment.

Hereinafter, a basic structure of an electromechanical transducer of this embodiment will be described with reference to FIGS. 1 to 6. In FIGS. 1 to 3 and 6, an X-direction (a first direction of this disclosure), a Y-direction (a third direction of this disclosure), and a Z-direction (a second direction of this disclosure) perpendicular to each other are each indicated by arrows. The electromechanical transducer of this embodiment does not exhibit upper, lower, right, and left directionalities. However, for the sake of convenience in the following description, there might be a case where upper, lower, right, and left directions are indicated according to the directions (X, Y, Z) of each drawing (the plane of paper).

Figure 2:
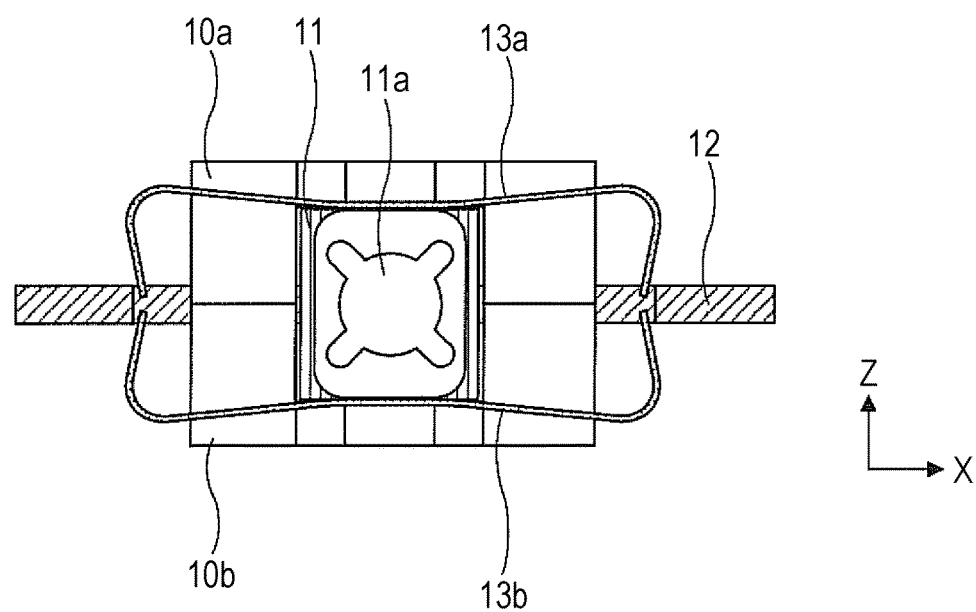
FIG. 2 is a front view of the driver of the electromechanical transducer of FIG. 1 from one side of a Y-direction.
Figure 3:
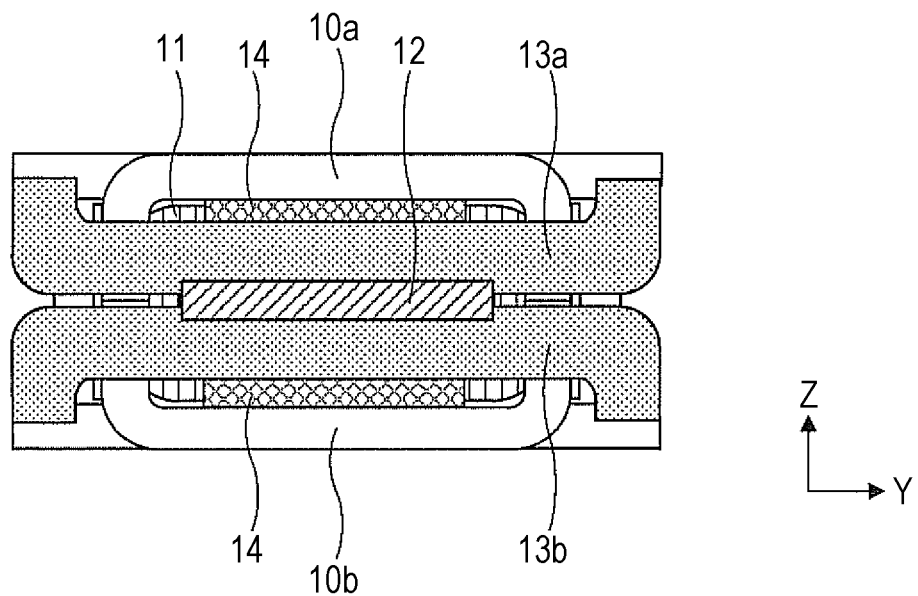
FIG. 3 is a side view of the driver of the electromechanical transducer of FIG. 1 from one side of an X-direction.
Figure 4:
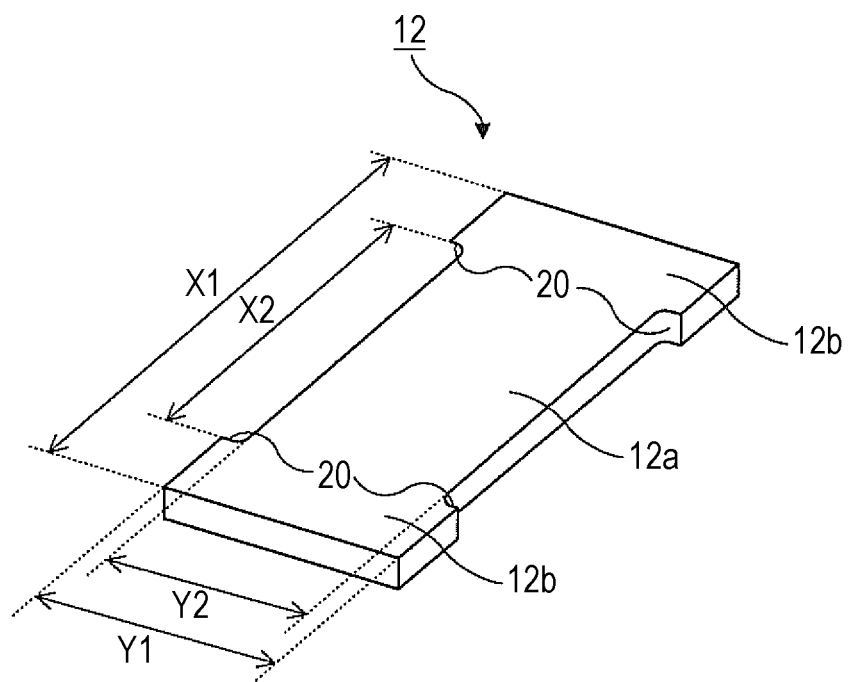
FIG. 4 is a perspective view of an entire structure of an armature.
Figure 5:
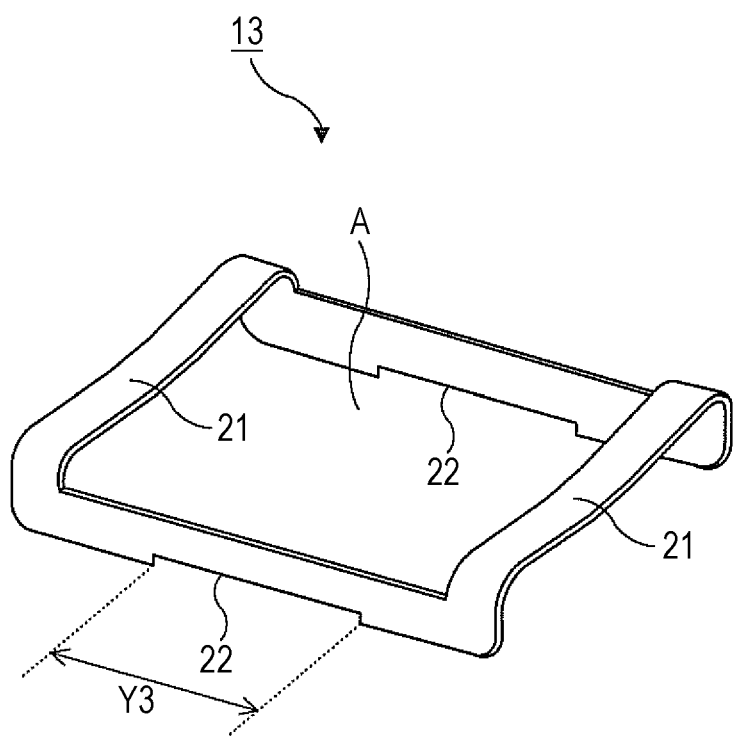
FIG. 5 is a perspective view of an entire structure of a spring member.

FIG. 1 is an upper view of the electromechanical transducer of this embodiment from one side of the Z-direction. FIG. 2 is a front view of the electromechanical transducer of FIG. 1 from one side of the Y-direction. FIG. 3 is a side view of the electromechanical transducer of FIG. 1 from one side of the X-direction. Moreover, FIGS. 4 to 6 relate to characteristic components of the electromechanical transducer of this embodiment. FIG. 4 is a perspective view of an entire structure of an armature 12. FIG. 5 is a perspective view of an entire structure of a spring member 13. Moreover, FIG. 6 is an exploded perspective view of a later-described magnetic circuit portion in the electromechanical transducer of this embodiment.

FIGS. 1 to 3 illustrate a pair of yokes 10 (10*a*, 10*b*), a coil 11, the armature 12, a pair of spring members 13 (13*a*, 13*b*), and two pairs (four) of magnets 14 in a driver of the electromechanical transducer of this embodiment. Part of the driver other than the armature 12 and the pair of spring members 13 (13*a*, 13*b*), i.e., the pair of yokes 10, the coil 11, and the four magnets 14, functions as an integrally-located structural portion of this disclosure. That is, the armature 12 penetrates between the yokes 10 (10a, 10b) (an internal space of the structural portion). Moreover, the armature 12 is located through the pair of spring members 13 so as to be movable relative to the structural portion. Note that although not shown in FIGS. 1 to 6, the entirety of the electromechanical transducer of this embodiment is integrally accommodated in a later-described housing 30 (see FIGS. 7 and 8).

For the pair of yokes 10 (10a, 10b), the upper yoke 10a and the lower yoke 10b are located to face each other in the Z-direction. In this state, the upper yoke 10a and the lower yoke 10b are integrally fixed together by, e.g., welding. For example, a soft magnetic material such as permalloy with 45% of Ni can be used as the materials of the yokes 10a, 10b. As illustrated in FIG. 6, the air core coil 11 is located with the coil 11 being sandwiched between the upper and lower yokes 10a, 10b at the center on the inside of the upper and lower yokes 10a, 10b. A through-hole opening at both ends in the X-direction is formed at the coil 11. Further, electrodes 11a (see FIGS. 1 and 2) in a pair are each provided at both ends of the coil 11 in the Y-direction. The pair of electrodes 11a is electrically connected to the coil 11. The coil 11 is, with an adhesive, fixed to the inside of the yokes 10a, 10b.

As illustrated in FIG. 6, the two plate-shaped magnets 14 are symmetrically located at both inner end portions of the yoke 10a in the X-direction. Further, the two plate-shaped magnets 14 are symmetrically located at both inner end portions of the yoke 10b in the X-direction. That is, the magnets 14 facing each other in an upper-to-lower direction are located in a pair at one ends of the yokes 10a, 10b in the X-direction. Further, the magnets 14 facing each other in the upper-to-lower direction are located in a pair at the other ends of the yokes 10a, 10b in the X-direction. These magnets 14 are each, with an adhesive, fixed to the inside of the yokes 10a, 10b. A space is formed between the magnets 14 in each pair. These two pairs of magnets are magnetized in opposite directions, for example.

The armature 12 is a flat plate-shaped member elongated in the X-direction. The armature 12 is located to penetrate the space (a first space) between the magnets 14 at one ends in the X-direction, the through-hole of the coil 11, and the space (a second space) between the magnets 14 at the other ends in the X-direction. As illustrated in FIG. 4, the armature 12 includes an inner portion 12a and outer portions 12b. The inner portion 12a is positioned in a space (the internal space of the structural portion including the first space, the through-hole of the coil 11, and the second space as described above) facing the yokes 10a, 10b. The outer portions 12b protrude from both sides of the inner portion 12a in the X-direction.

in an XY plane, the length of the entirety of the armature 12 is taken as X1, and the width of the entirety of the armature 12 is taken as Y1. Further, the length of the inner portion 12a is taken as X2, and the width of the inner portion 12a is taken as Y2. Note that the width of each of the outer portions 12b on both sides of the inner portion 12a is the same as the width Y1 of the entirety of the armature 12. In the armature 12, the inner portion 12a is narrower than the outer portion 12b on each side (Y1>Y2), Thus, step portions 20 are formed at four spots such that each step portion 20 is at a boundary between the inner portion 12a and a corresponding one of the outer portions 12b on both sides. Moreover, the above-described magnets 14 are located to face the inner portion 12a of the armature 12. The width Y2 of the inner portion 12a as described herein is the substantially same as that of the magnet 14. As is the case in the yokes 10a, 10b, a soft magnetic material such as permalloy with 45% of Ni can be, for example, used as the material of the armature 12.

The armature 12, the yokes 10a, 10b, the coil 11, and the two pairs (four) of magnets 14 form a magnetic circuit. That is, the armature 12 and the structural portion (the pair of yokes 10, the coil 11, and the four magnets 14) together form the magnetic circuit through regions facing the two pairs of magnets 14. Note that although not shown in FIGS. 1 to 6, two pairs (four) of pole pieces (pole shoes) may be provided to each face the two pairs (four) of magnets 14. That is, the armature 12, the yokes 10a, 10b, the coil 11, the two pairs (four) of magnets 14, and the two pairs (four) of pole pieces may form a magnetic circuit. This structure will be described later.

In a state in which the armature 12 is inserted into the through-hole of the coil 11, four clearances parallel to each other are formed among the armature 12 and the two pairs (four) of magnets 14. Each clearance forms an air gap. The four air gaps have an equal size and an equal shape. These clearances are formed to have such proper size and shape that when the armature 12 displaces in the Z-direction within a normal operation range, the armature 12 does not contact the coil 11 and the magnets 14.

The pair of spring members 13 (a pair of elastic members of this disclosure; the spring members 13a, 13b) is a pair of plate springs each formed in such a manner that a plate-shaped member with an opening A is bent. One spring member 13a is located above the armature 12. The other spring member 13b is located below the armature 12. As illustrated in FIG. 5, each spring member 13 (13a, 13b) is formed from a plate-shaped member having substantially constant width and thickness and surrounding a quadrangular center opening A. Note that the upper spring member 13a and the lower spring member 13b have such a structure that the upper and lower spring members 13a, 13b are symmetric with respect to the armature 12 in the Z-direction. Thus, FIG. 5 illustrates the structure common to the upper spring member 13a and the lower spring member 13b. For example, a stainless steel material (SUS301, SUS304) can be used as the material of the spring member 13.

As illustrated in FIG. 5, a pair of fixing portions 21 and a pair of recessed portions 22 (engagement portions of this disclosure) are formed at each spring member 13. The fixing portions 21 are, by, e.g., laser welding, each fixed to lower surfaces of protruding portions provided at the center of each yoke 10 on both sides thereof and protruding in the Y-direction. Both sides (both ends) on each of two sides of the spring member 13 with the fixing portions 21 are bent in the Z-direction toward the armature 12. The recessed portions 22 are each formed on two sides (sides intersecting the sides with the fixing portions 21) connecting the bent portions. Each recessed portion 22 is formed in such a manner that a portion of each side facing the armature 12 is cut out. Both ends of each recessed portion 22 engage with the above-described step portions 20 each formed between the inner portion 12a and a corresponding one of the outer portions 12b on both sides at the armature 12. Thus, as illustrated in FIG. 5, the length Y3 of each recessed portion 22 in the Y-direction is set slightly greater than the width Y2 of the inner portion 12a of the armature 12 in the Y-direction.

The role of the pair of spring members 13 will be described. In the magnetic circuit, the armature 12 displaces in the Z-direction (the second direction) relative to the structural portion by magnetic force of the magnetic circuit.

In this state, the pair of spring members 13 provides restoring force proportional to the degree of displacement to the armature 12. In this embodiment, the spring members 13 with the same structure are each provided on both sides of the armature 12 in the Z-direction. Thus, the restoring force (a restoring force change) against displacement of the armature 12 acts symmetrically with respect to the Z-direction. Here, although not shown in the figure, the spring members 13 are fixed to the yokes 10 with the spring members 13 being slightly pressed in the Z-direction. Thus, the armature 12 is sandwiched between the spring members 13 in the Z-direction. In this state, the position of balancing the armature 12 is preferably at an equal distance in the Z-direction from each of opposing surfaces of the two magnets 14 facing each other in the Z-direction.

Note that various designs are available for the dimension parameters and detailed structures of the spring member 13. For example, various dimensions and shapes can be employed as the width, thickness, each side length, opening-A size, and the like of the spring member 13 as long as the pair of fixing portions 21 and the pair of recessed portions 22 can fulfill functions and the restoring force provided to the armature 12 can be obtained. The dimension parameters of the spring member 13 are designed to obtain a spring constant according to the restoring force provided to the armature 12. Moreover, the opening A is provided at the spring member 13, and therefore, upper and lower surfaces as part of the yoke 10 project in the Z-direction with respect to the spring member. Thus, when the electromechanical transducer is handled, the upper and lower surfaces of the yoke 10 facing the opening A can be utilized. As a result, occurrence of position shifting due to application of external force to the spring members 13 can be suppressed, for example.

Next, the housing 30 configured to accommodate the entirety of the electromechanical transducer of this embodiment will be described with reference to FIGS. 7 and 8. In the electromechanical transducer of this embodiment, relative oscillation between the structural portion (the yokes 10, the coil 11, and the magnets 14) and the armature 12 is generated due to drive force according to current flowing upon application of an electric signal to the coil 11. Thus, both ends of the armature 12 are fixed to the housing 30 with sufficient stiffness so that the drive force generated between the armature 12 and the structural portion can be favorably transmitted to the housing 30, This generates oscillation at the housing 30.

Figure 7:
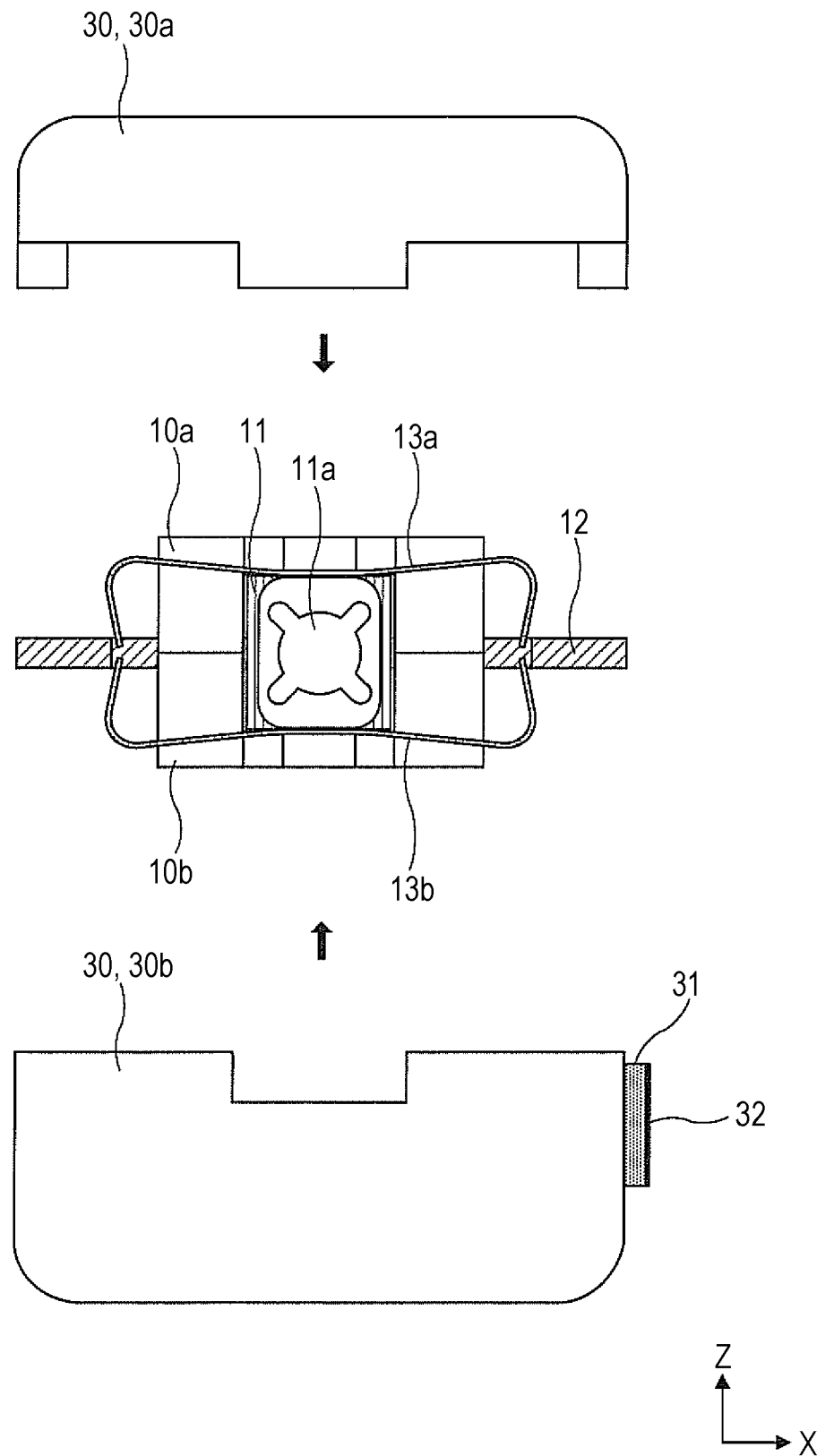
FIG. 7 illustrates the driver of the electromechanical transducer of the embodiment and a housing configured to accommodate the entirety of the driver.

FIG. 7 illustrates the driver with the structure illustrated in FIG. 2 and the housing 30 configured to accommodate the entirety of the driver. In this figure, the housing 30 is detached from the driver. Moreover, FIG. 8 illustrates the housing 30 accommodating the entirety of the electromechanical transducer in an integrated state. The housing 30 includes an upper housing member 30a and a lower housing member 30b (a pair of upper and lower housing members 30a, 30b). FIG. 7 illustrates the electromechanical transducer viewed in the same direction as that of FIG. 2, the upper housing member 30a, and the lower housing member 30b. A raised portion is provided on each side of the upper housing member 30a. A recessed portion is provided on each side of the lower housing member 30b. These raised and recessed portions are formed to fit with each other when the upper housing member 30a and the lower housing member 30b are combined together. After the raised and recessed portions have been combined together to fit with each other, the upper housing member 30a and the lower housing member 30b are fixed with, e.g., an adhesive. Thus, the integrated housing 30 accommodating the electromechanical transducer is formed as illustrated in FIG. 8. The housing 30 has driver supportable strength. For example, a plastic material and a metal material such as stainless steel can be used as the material of the housing 30. Note that the recessed portion may be provided on each side of the upper housing member 30a, and the raised portion may be provided on each side of the lower housing member 30b.

Figure 8:
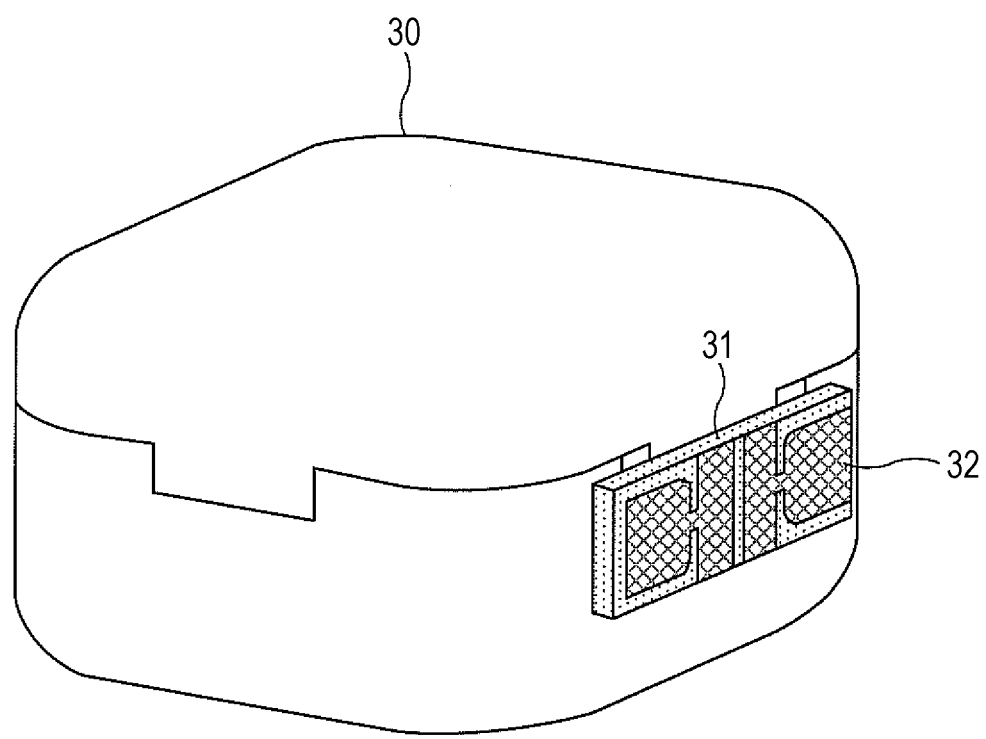
FIG. 8 illustrates the housing accommodating the entirety of the electromechanical transducer of the embodiment in an integrated state.

As illustrated in FIGS. 7 and 8, a substrate 31 is set to a side surface of the lower housing member 30b. A pair of electrodes 32 is provided on a surface of the substrate 31. The pair of electrodes 32 is electrically connected to the pair of electrodes 11a of the coil 11 described above. Thus, a wire (not shown) extending out of each electrode of the coil 11 is connected to a corresponding one of the electrodes 32 through an opening of the housing member 30a. Moreover, for enhancing impact resistance of the electromechanical transducer, a plurality of stoppers (not shown) protruding inwardly may be provided on inner surfaces of the upper and lower housing members 30a, 30b. In this structure, the movable range of the driver including the yokes 10 and the like is limited.

As illustrated in FIG. 7, the lengths of the upper and lower housing members 30a, 30b in the X-direction are substantially coincident with the length of the armature 12 in a longitudinal direction thereof. Moreover, both end portions of the armature 12 are fixed to the upper and lower housing members 30a, 30b by, e.g., an adhesive with these end portions being sandwiched between the upper and lower housing members 30a, 30b. Note that the housing 30 is configured not to contact the driver except for both ends of the armature 12. A joint portion between the armature 12 and the housing 30 preferably has sufficient stiffness so that oscillation generated at the driver can be favorably transmitted to the housing 30.

As described above, according to the structure of the electromechanical transducer of this embodiment, the yokes 10 project on the upper and lower sides in the Z-direction through the openings A of the spring members 13. Further, each spring member 13 is fixed to a corresponding one of the yokes 10 through the pair of fixing portions 21, and engages with the armature 12 through the pair of recessed portions 22. As described above, the electromechanical transducer of this embodiment has a simple structure. Here, there might be a case where the driver of the electromechanical transducer is handled with the driver being not accommodated in the housing 30 (e.g., when the driver is taken out of a storage pallet and when the driver is carried at a subsequent process). In this case, occurrence of a situation where a position relationship between the armature 12 and the structural portion is shifted due to application of external force to the spring members 13 covering the upper and lower yokes 10 upon contact as in the structure of Japanese Patent No. 5579335 can be suppressed. Moreover, it is not necessary to locate four spring members with a complicated structure on both sides of the armature 12 as in the structure of Japanese Patent No. 5653543. Thus, easy assembly and size reduction of the electromechanical transducer can be realized.

Figure 9:
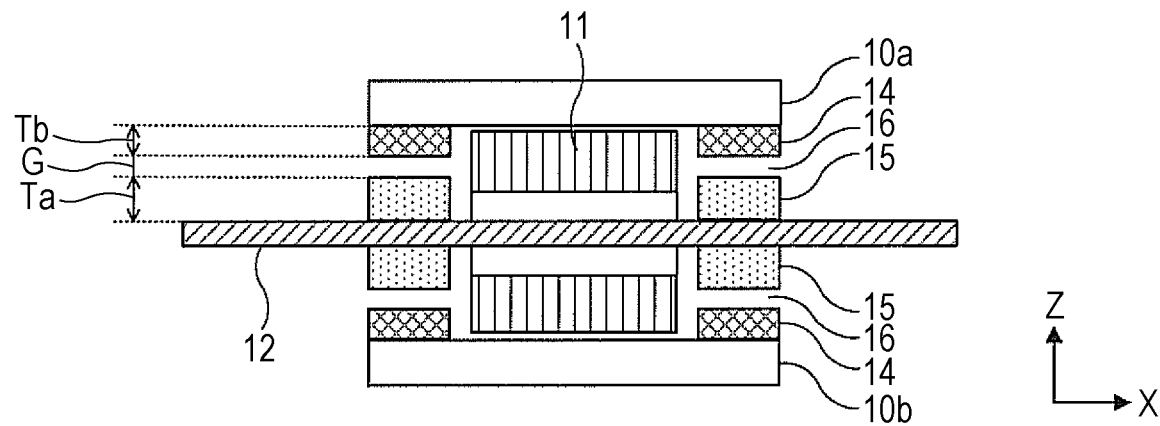
FIG. 9 illustrates a structure example of the electromechanical transducer of the embodiment, and in this structure example, four pole pieces are located in addition to four magnets in two regions of the armature facing the X-direction.

Next, a structure applicable to the two regions of the armature 12 facing the four magnets 14 (the two pairs of magnets 14) will be described in association with the effect of the magnetic circuit in the electromechanical transducer of this embodiment. in a structure example illustrated in FIG. 9, a pair of pole pieces 15 (four pole pieces 15 in total) is, in addition to the pair of magnets 14 (the four magnets 14 in total), located in each of the two regions of the armature 12 facing the X-direction. FIG. 9 is an XZ sectional structural view of a partial structure of the electromechanical transducer of this embodiment from the same direction as that of FIG. 2, the partial structure including the yokes 10, the coil 11, the armature 12, the four magnets 14, and the four pole pieces 15. In FIG. 9, other components are not shown.

As illustrated in FIG. 9, in this structure example, the pairs of pole pieces 15 (the four pole pieces 15 in total) are each located on both sides (upper and lower surfaces) of the armature 12 in the Z-direction at the positions (the positions facing the magnets 14) of the two regions of the armature 12. Each pole piece 15 faces a corresponding one of the magnets 14. The shapes of the pole piece 15 and the magnet 14 are rectangular shapes with the same size as viewed in the plane, i.e., as viewed in the Z-direction. That is, the pole piece 15 has the same shape as that of the magnet 14 as viewed in the Z-direction. An air gap 16 is formed between the pole piece 15 and the magnet 14. The air gap 16 is a space with the same size as those of the pole piece 15 and the magnet 14 as viewed in the plane, i.e., as viewed in the Z-direction.

In the Z-direction as viewed in FIG. 9, the thickness Ta of the pole piece 15, the thickness Tb of the magnet 14, and the thickness G of the air gap 16 are different from each other. The thickness Ta of the pole piece 15 is set greater than the thickness Tb of the magnet 14 and the thickness G of the air gap 16. Note that the thickness Ta of the pole piece 15, the thickness Tb of the magnet 14, and the thickness G of the air gap 16 are set to satisfy a desired condition, and are not specifically limited.

Here, when current is applied to the coil 11, magnetic fluxes are generated at the armature 12, and the armature 12 displaces in the Z-direction against the structural portion. In the structure example illustrated in FIG. 9, the left magnets 14 and the right magnets 14 are magnetized in opposite directions. Thus, the regions overlapping these magnets 14 in the Z-direction correspond to two regions to which magnetic fluxes in opposite directions are guided. In the structure example of FIG. 9, the magnet 14 and the pole piece 15 having the same dimensions as those of the magnet 14 are located to face each other. This can enhance the degree of concentration of magnetic force lines at a portion where the magnet 14 and the pole piece 15 face each other. In this case, when the magnet 14 and the pole piece 15 move to shift relative to each other in the X-direction or the Y-direction, the force of shortening the magnetic force lines acting between the magnet 14 and the pole piece 15 acts on the magnet 14 and the pole piece 15 based on Maxwell's stress. For this reason, occurrence of position shifting is suppressed so that the magnet 14 (the structural portion) and the pole piece 15 (the armature 12) can be stably positioned.

Figure 10:
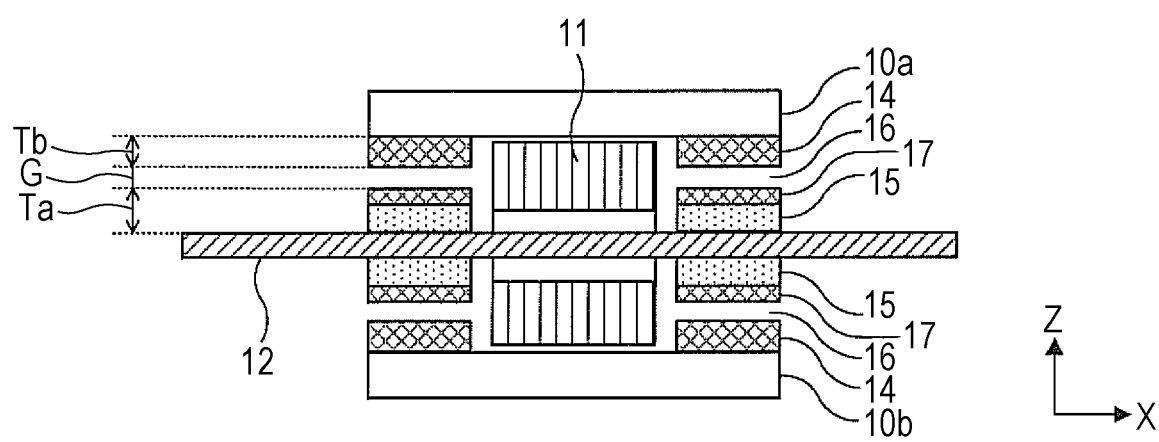
FIG. 10 illustrates a structure example of the electromechanical transducer of the embodiment, and in this structure example, four pole piece side magnets are located in addition to the four magnets and the four pole pieces illustrated in FIG. 9.

Next, in a structure example illustrated in FIG. 10, pole piece side magnets 17 are further located on the surfaces of the four pole pieces 15 illustrated in FIG. 9 to face the magnets 14. In FIG. 10, the thicknesses of the pole piece 15 and the pole piece side magnet 17 are set such that the total thickness of the pole piece 15 and the pole piece side magnet 17 is equal to the thickness Ta of the pole piece 15 of FIG. 9. The pole piece side magnet 17 has the same shape as that of the magnet 14 as viewed in the Z-direction. Structures of other portions are similar to those of the structure example illustrated in FIG. 9. In the structure example of FIG. 10, each magnet 14 faces a corresponding one of the magnetized pole piece side magnets 17 instead of the pole pieces 15 made of a soft magnetic material. Thus, the magnetic force lines are more concentrated, and therefore, positioning of the armature 12 is further stabilized by the Maxwell's stress.

The electromechanical transducer according to this embodiment has been described above. Note that the technique of this disclosure is not limited to the above-described embodiment. Various changes can be made to the above-described embodiment without departing from the gist of the technique of this disclosure. For example, various structures can be employed as the structure of the armature 12 illustrated in FIG. 4, the structure of the spring member 13 illustrated in FIG. 5, and the structures of other members as long as functions based on the technique of this disclosure can be fulfilled.

Moreover, the electromechanical transducer according to this disclosure is also applicable to an electroacoustic transducer configured to convert an electric signal into sound, thereby outputting the sound to the outside. Further, the electromechanical transducer according to this disclosure is also applicable to a hearing aid set to a user's cavity of concha, for example. Thus, sound generated by both of oscillation of the electromechanical transducer itself and oscillation of the housing 30 can be transmitted to a user's ear. For example, when such an electromechanical transducer is applied to the hearing aid set to the cavity of concha, the outer shape of the housing 30 is preferably in a shape suitable for setting to the cavity of concha.

The embodiment of this disclosure may relate to the following first to ninth electromechanical transducers.

The first electromechanical transducer is an electromechanical transducer for converting an electric signal into mechanical oscillation. The electromechanical transducer includes a structural portion configured such that at least two pairs of magnets, a yoke configured to guide magnetic fluxes from the magnets, and a coil configured to receive the supplied electric signal are located integrally; an armature having an inner portion penetrating an internal space of the structural portion and outer portions protruding from the inner portion toward both sides in a first direction, forming, together with the structural portion, a magnetic circuit through two regions of the inner portion to which the magnetic fluxes in opposite directions are guided, and configured to displace in a second direction perpendicular to the first direction by magnetic force of the magnetic circuit; and a pair of elastic members each located on both sides of the armature in the second direction, and configured to provide, to the armature, restoring force according to relative displacement of the armature corresponding to the structural portion. Each elastic member has an opening surrounding the yoke, and part of the yoke projects from the opening in the second direction.

The second electromechanical transducer is the first electromechanical transducer in which each elastic member includes engagement portions engaging with the armature on both sides in the first direction, and a fixing portion fixed to part of the yoke.

The third electromechanical transducer is the second electromechanical transducer in which each engagement portion is a recessed portion facing the armature.

The fourth electromechanical transducer is the third electromechanical transducer in which the armature is configured such that the outer portions are formed to have a width greater than that of the inner portion to form step portions and the recessed portion of each elastic member engages with the step portions.

The fifth electromechanical transducer is any one of the second to fourth electromechanical transducers, in which the yoke has protruding portions formed on both sides in a third direction perpendicular to the first direction and the second direction and the fixing portion is fixed to a corresponding one of the protruding portions.

The sixth electromechanical transducer is any one of the first to fifth electromechanical transducers, in which each elastic member is a spring member formed from a plate-shaped member.

The seventh electromechanical transducer is the second electromechanical transducer in which two pairs of flat plate-shaped pole pieces each facing the two pairs of magnets are set to the armature.

The eighth electromechanical transducer is the seventh electromechanical transducer in which each pole piece has, as viewed in the second direction, the same shape as that of a corresponding one of the magnets facing each other through the two regions.

The ninth electromechanical transducer is the eighth electromechanical transducer in which a pole piece side magnet is provided on a surface of each pole piece and the pole piece side magnet has the same shape as that of a corresponding one of the magnets as viewed in the second direction.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An electromechanical transducer comprising:
   a structural portion configured such that two pairs of magnets magnetized in opposite directions, a yoke configured to guide magnetic fluxes from the magnets, and a coil configured to receive a supplied electric signal are located integrally;
   an armature
      having an inner portion penetrating an internal space of the structural portion and outer portions protruding from the inner portion toward both sides in a first direction;
      forming, together with the structural portion, a magnetic circuit through regions of the inner portion facing the two pairs of magnets, and
      configured to displace in a second direction perpendicular to the first direction by magnetic force of the magnetic circuit; and
   a pair of elastic members
      each located on both sides of the armature in the second direction, and
      configured to provide, to the armature, restoring force according to relative displacement of the armature corresponding to the structural portion, wherein
   each elastic member has an opening surrounding the yoke, and
   part of the yoke projects from the opening in the second direction.

2. The electromechanical transducer according to claim 1, wherein
   each elastic member includes
      engagement portions engaging with the armature on both sides in the first direction, and
      a fixing portion fixed to part of the yoke.

3. The electromechanical transducer according to claim 2, wherein
   each engagement portion is a recessed portion engaging with the armature.

4. The electromechanical transducer according to claim 3, wherein
   each outer portion of the armature has a width greater than that of the inner portion,
   a step portion is formed between each outer portion and the inner portion, and
   the recessed portion of each elastic member engages with the step portion.

5. The electromechanical transducer according to claim 2, wherein
   the yoke has protruding portions formed on both sides in a third direction perpendicular to the first direction and the second direction, and
   the fixing portion is fixed to a corresponding one of the protruding portions.

6. The electromechanical transducer according to claim 3, wherein
   the yoke has protruding portions formed on both sides in a third direction perpendicular to the first direction and the second direction, and
   the fixing portion is fixed to a corresponding one of the protruding portions.

7. The electromechanical transducer according to claim 4, wherein
   the yoke has protruding portions formed on both sides in a third direction perpendicular to the first direction d the second direction, and
   the fixing portion is fixed to a corresponding one of the protruding portions.

8. The electromechanical transducer according to claim 1, wherein
   each elastic member is a spring member formed from a plate-shaped member.

9. The electromechanical transducer according to claim 2, wherein
   each elastic member is a spring member formed from a plate-shaped member.

10. The electromechanical transducer according to claim 3, wherein
    each elastic member is a spring member formed from a plate-shaped member.

11. The electromechanical transducer according to claim 4, wherein
    each elastic member is a spring member formed from a plate-shaped member.

12. The electromechanical transducer according to claim 5, wherein
    each elastic member is a spring member formed from a plate-shaped member.

13. The electromechanical transducer according to claim 6, wherein
    each elastic member is a spring member formed from a plate-shaped member.

14. The electromechanical transducer according to claim 7, wherein
    each elastic member is a spring member formed from a plate-shaped member.

15. The electromechanical transducer according to claim 2, further comprising:
    two pairs of flat plate-shaped pole pieces set to the armature and each facing the two pairs of magnets.

16. The electromechanical transducer according to claim 15, wherein each pole piece has an identical shape to that of a corresponding one of the magnets as viewed in the second direction.

17. The electromechanical transducer according to claim 16, further comprising:
a pole piece side magnet provided on a surface of each pole piece, wherein
the pole piece side magnet has an identical shape to that of a corresponding one of the magnets as viewed in the second direction.

* * * * *